July 1, 1947.   J. H. BARNES   2,423,286
PROFILE GENERATING MECHANISM
Filed June 9, 1941   9 Sheets-Sheet 1

INVENTOR.
James H. Barnes
BY
Barnes, Kisselle, Laughlin & Raisch
ATTORNEYS.

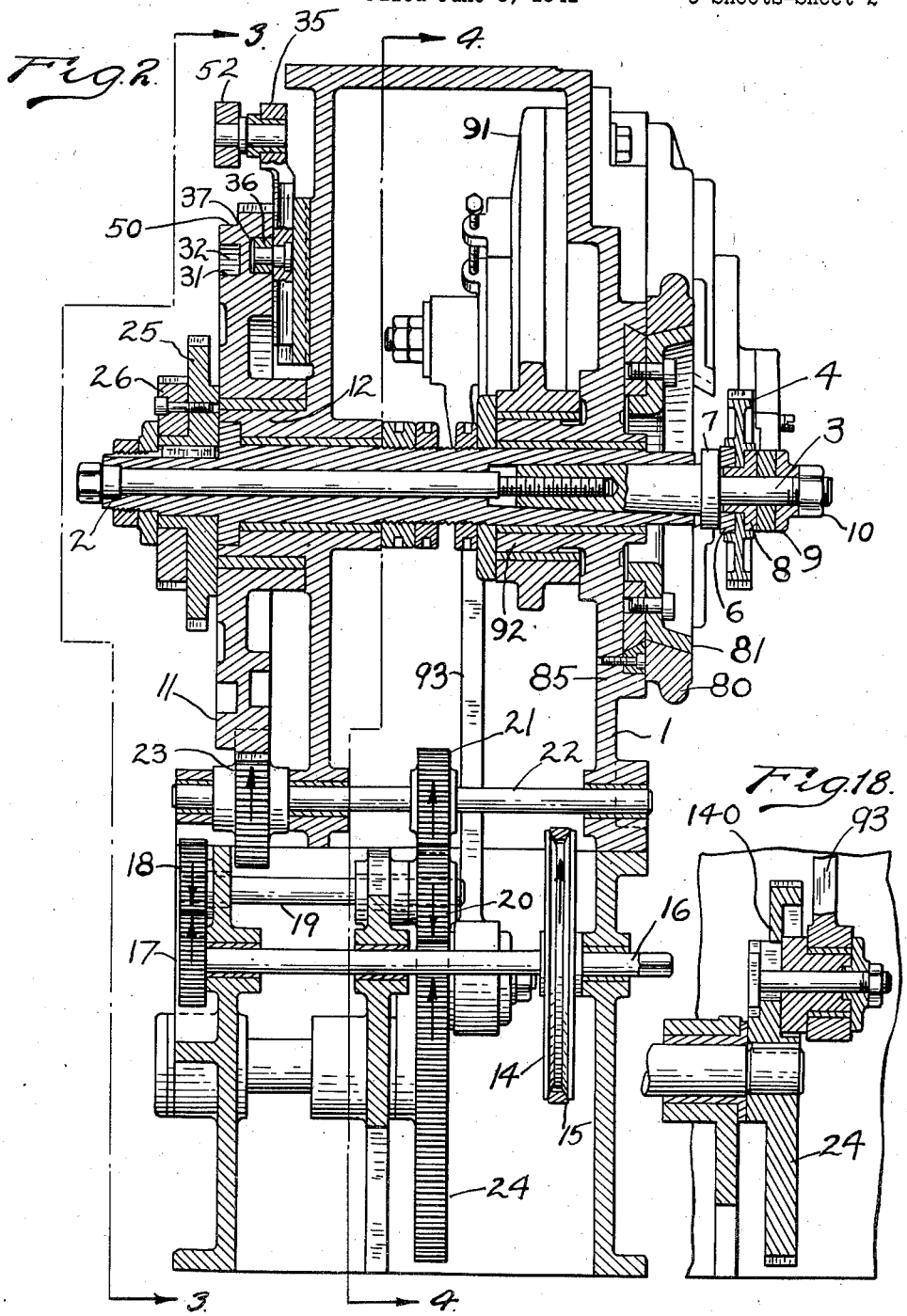

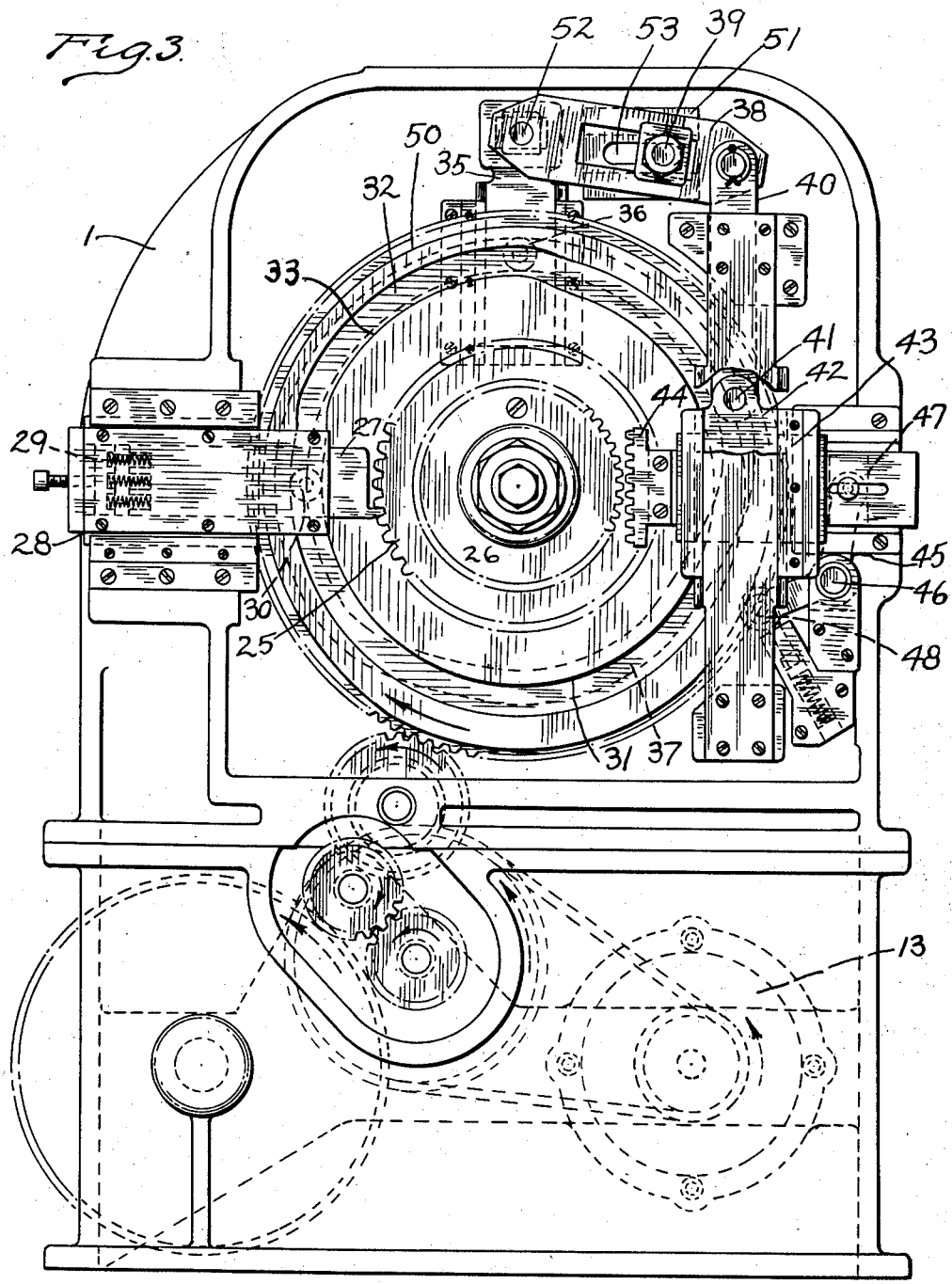

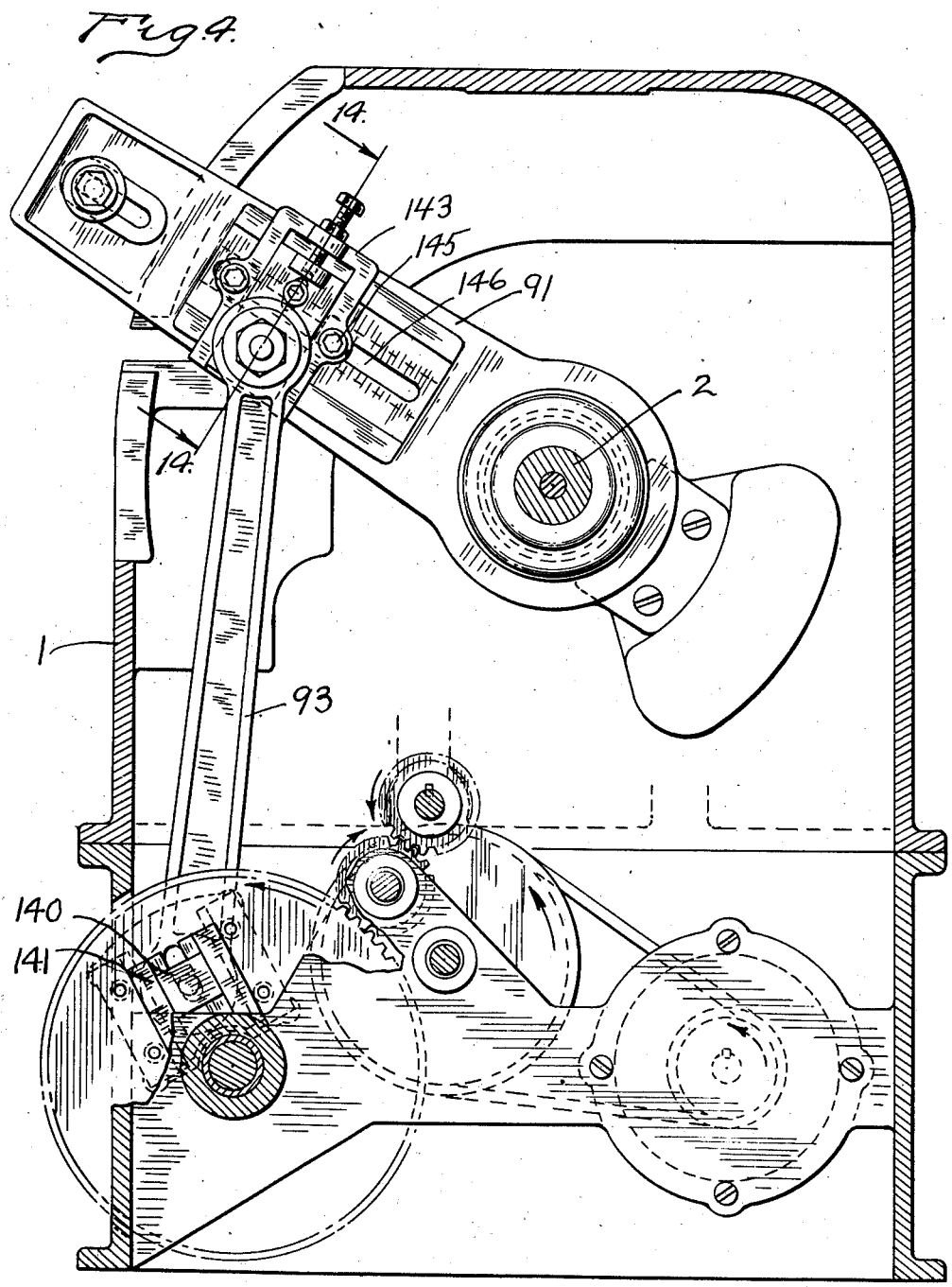

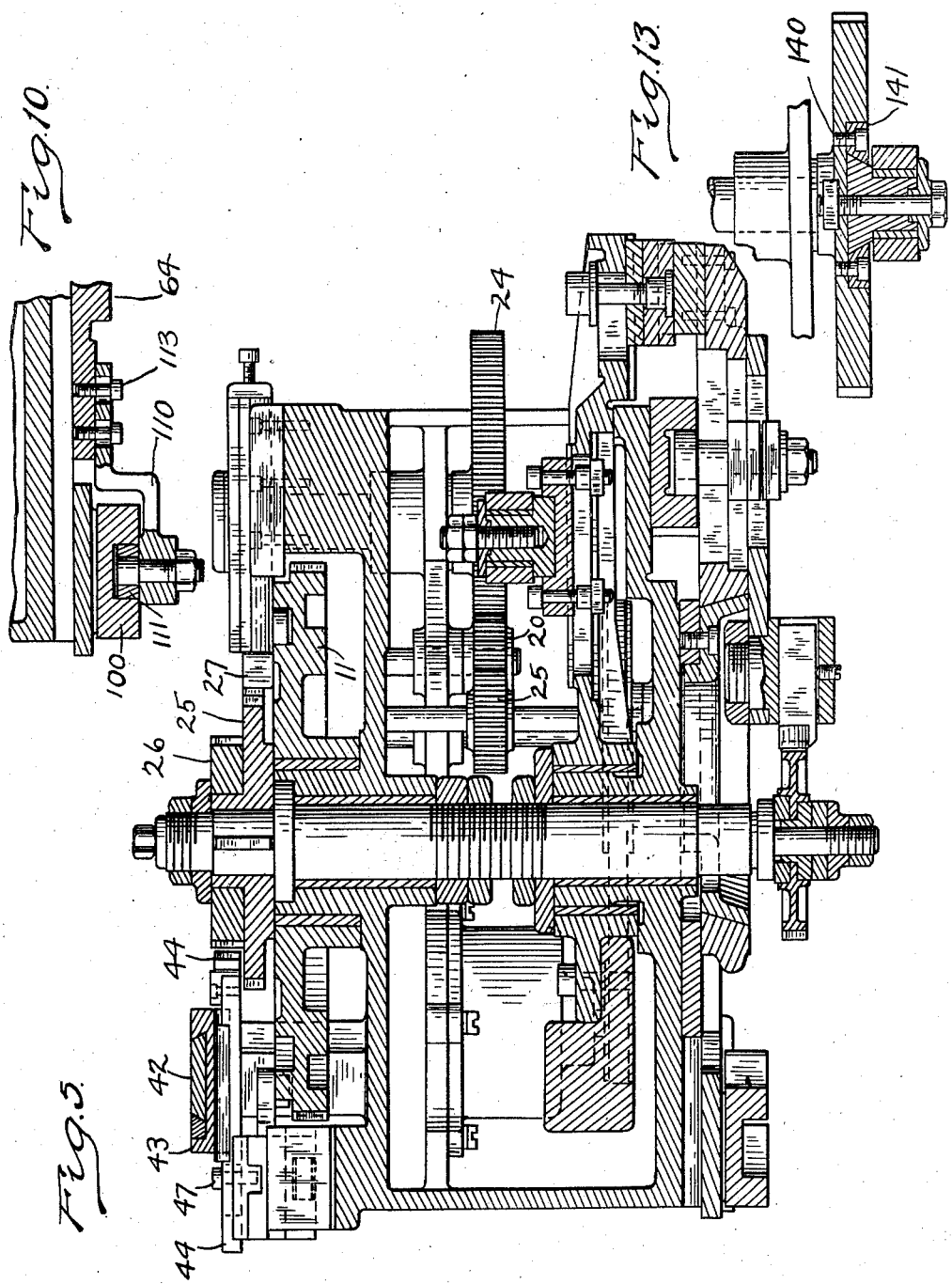

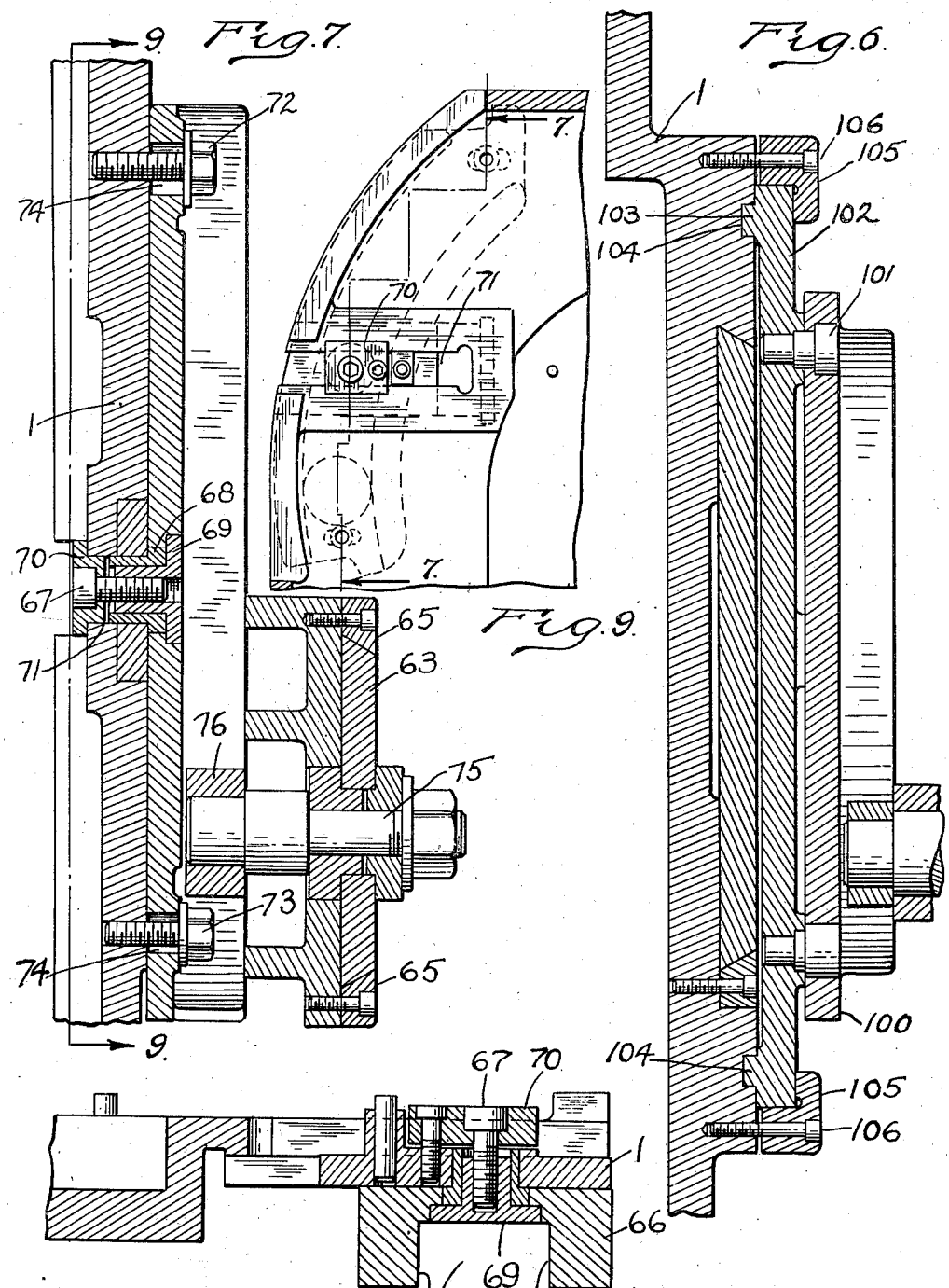

July 1, 1947.　　　J. H. BARNES　　　2,423,286
PROFILE GENERATING MECHANISM
Filed June 9, 1941　　　9 Sheets-Sheet 7
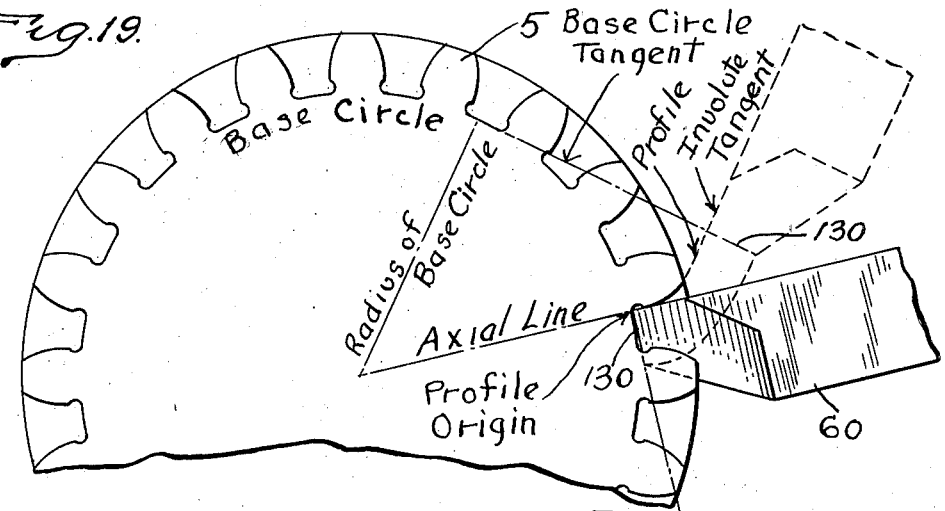
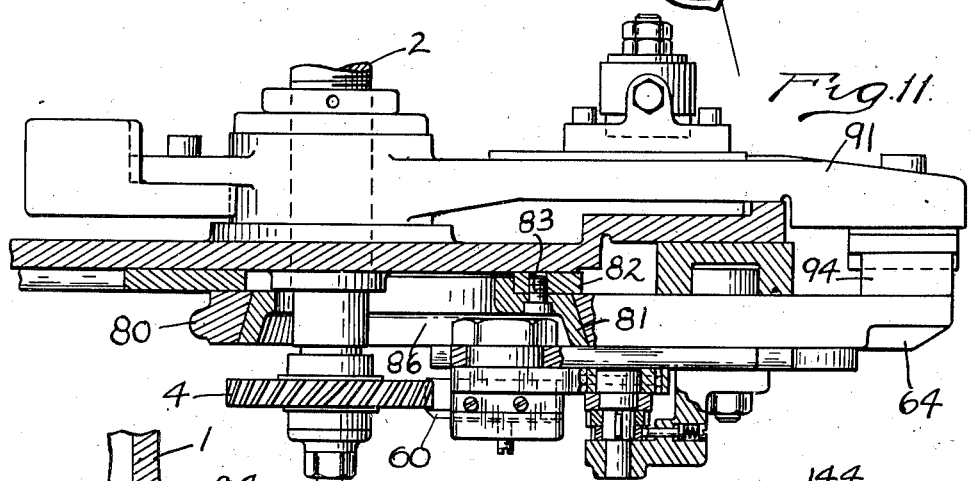
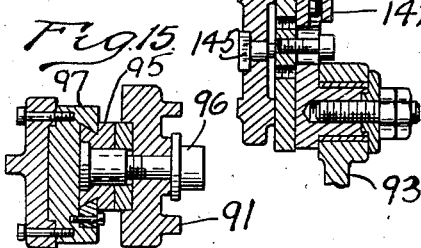
INVENTOR.
James H. Barnes
BY
Barnes, Kisselle, Laughlin & Raisch
ATTORNEYS.

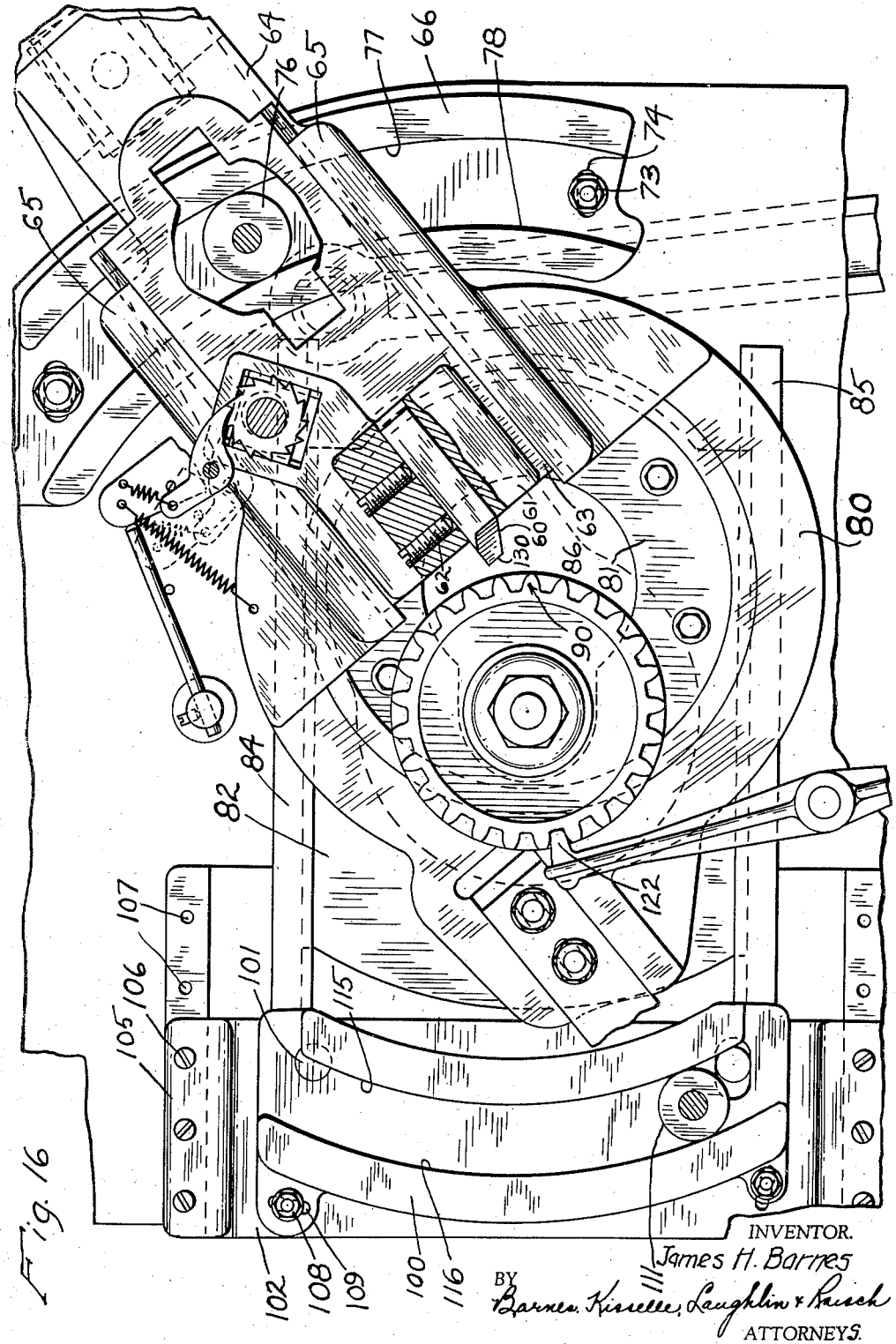

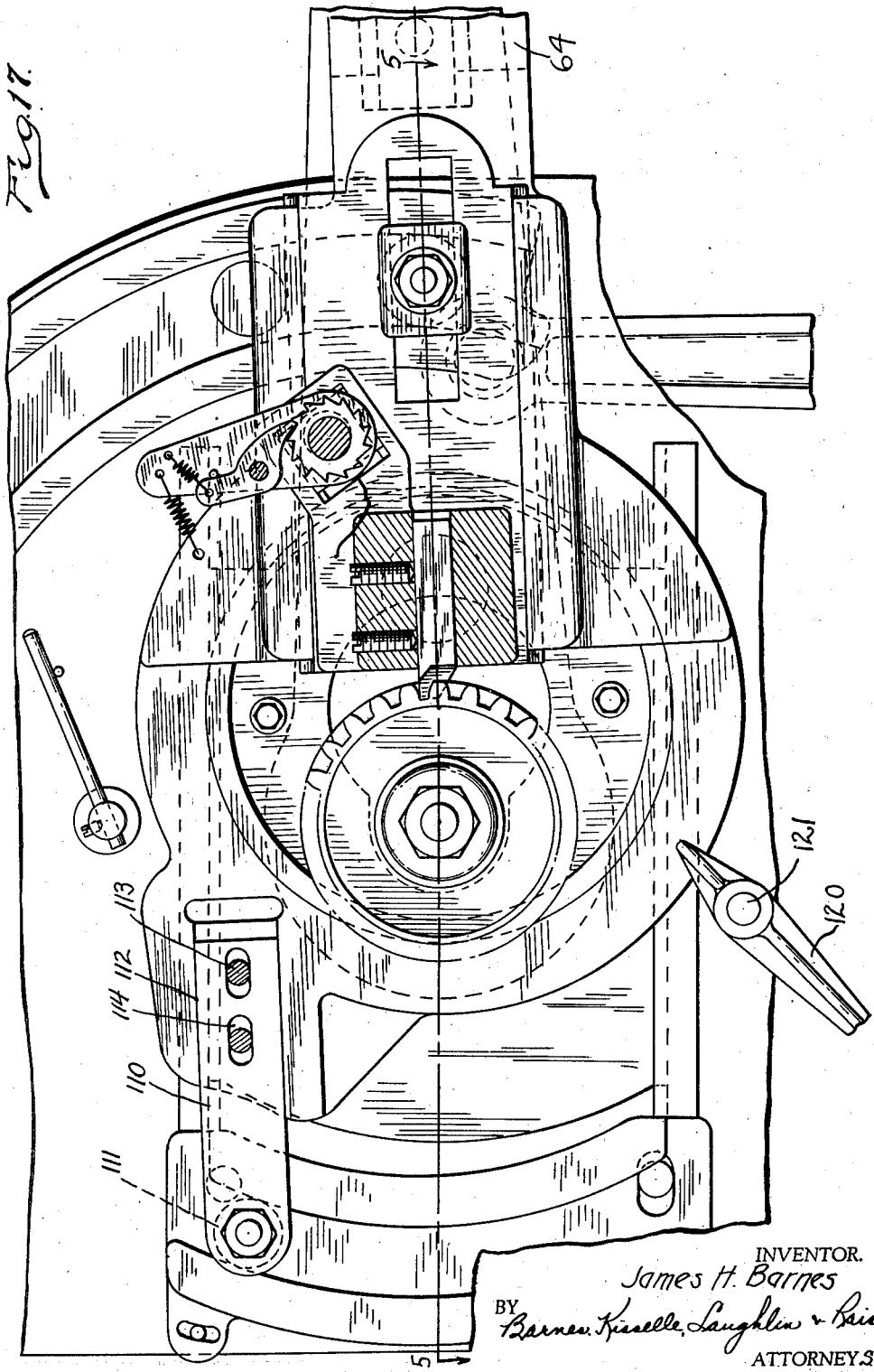

Patented July 1, 1947

2,423,286

UNITED STATES PATENT OFFICE 2,423,286

PROFILE GENERATING MECHANISM

James H. Barnes, Dayton, Ohio

Application June 9, 1941, Serial No. 397,171

9 Claims. (Cl. 90—3)

1

This invention relates to a profile generating mechanism and is particularly well adapted for generating the profiles of the teeth of gears and similar rolling power transmitting elements.

It is the object of this invention to produce a profile generating mechanism which will produce a rolling power transmitting element, such as a gear, of greater accuracy than heretofore possible. The greater accuracy in the generation of the profile in the gear tooth results in quieter operation of the gears.

Another object of this invention is to produce a profile generating mechanism for rolling power transmitting elements which is highly flexible and which can generate or shape any profile desired where the profile is generated from a continuous curved evolute.

This invention also contemplates a profile generating mechanism which is universal in application because with the same tool it can generate or shape a gear or other rolling power transmitting element of any pitch.

Another feature of the invention is that it utilizes a simple tool, such as a simple cutting or shaping tool, which will generate gear teeth from any base circle diameter within the range of the machine elements.

The machine is useful in generating the profiles of all types of rolling power transmitting elements such as spur, helical, herring-bone, internal, and bevel gears as well as an infinite variety of toothed elements.

The machine is useful in generating convex as well as concave profiles or surfaces and all types of involute curved surfaces including the circular involute curved surface. This machine will generate any desired precise form of involute curve and the same tool will cut gears of any pitch or pressure angle within the range of the machine.

In the drawings:

Fig. 2 is a vertical section along the line 2—2 of Fig. 1.

Fig. 3 is a rear elevation of the machine along the line 3—3 of Fig. 2.

Fig. 4 is a vertical section along the line 4—4 of Fig. 2.

Fig. 5 is a horizontal section along the line 5—5 of Fig. 17.

2

Figure 1:
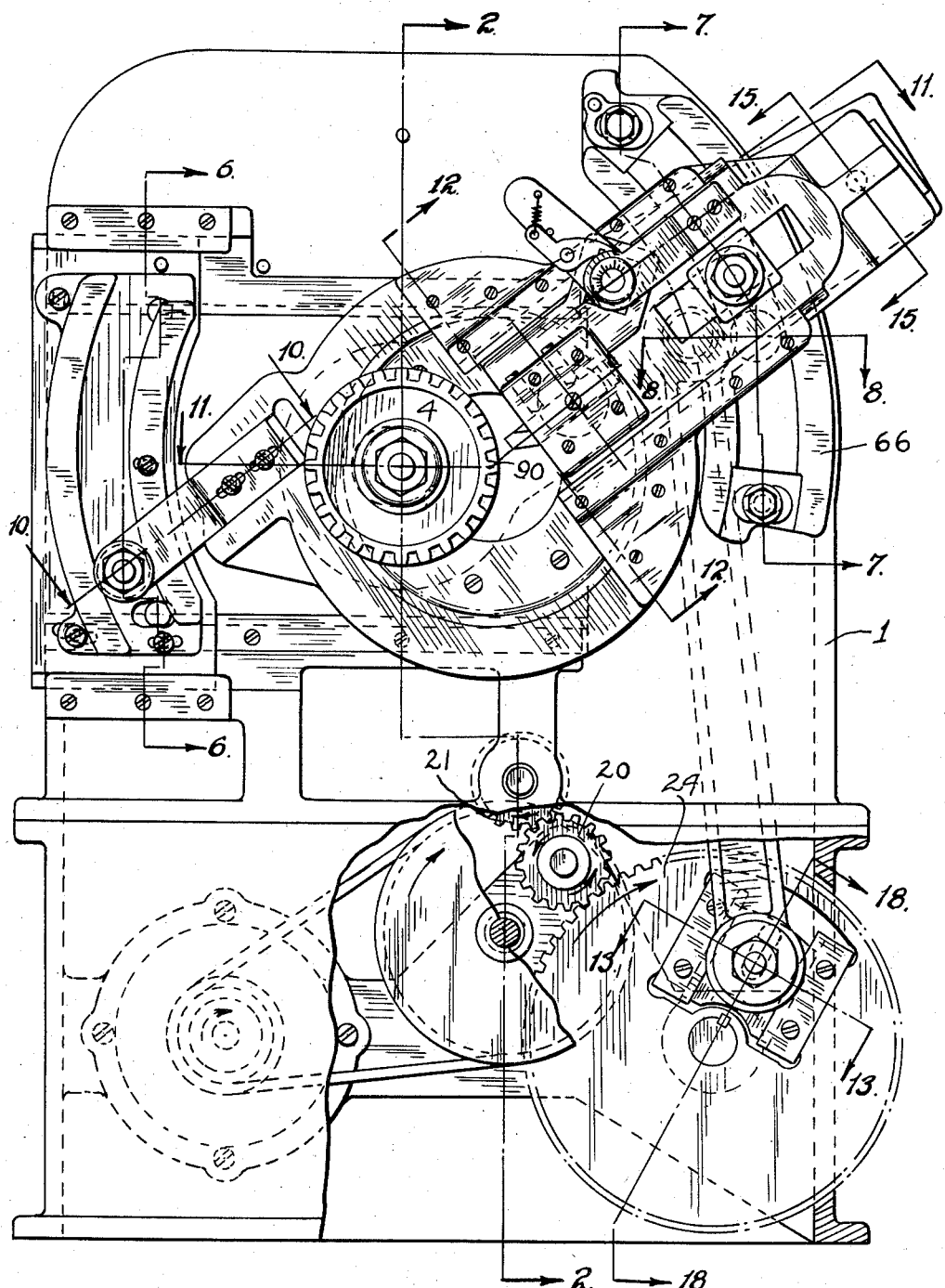
Fig. 1 is a front elevation of the machine.

Figs. 6, 7 and 8 are sections along the lines 6—6, 7—7 and 8—8 of Fig. 1.

Fig. 9 is a section along the line 9—9 of Fig. 7.

Figs. 10, 11, 12, 13, 15 and 18 are sections along the lines 10—10, 11—11, 12—12, 13—13, 15—15, and 18—18 of Fig. 1.

Fig. 14 is a section along the line 14—14 of Fig. 4.

Fig. 16 is a front elevation of a portion of the machine showing the cutting tool and its control elements in non-cutting position.

Fig. 17 is a front elevation similar to Fig. 16 but showing the cutting tool and its control elements at the end of the cutting or shaving stroke.

Fig. 19 is a detail showing a roughed out gear which is being cut and the path traversed by the cutting tool.

Referring more particularly to the drawings, the frame of the machine is designated 1. The frame has journaled therein a shaft 2. One end of the shaft 2 is provided with a spindle 3 which serves as a work holder. This machine is adapted to generate the profiles of an infinite variety of power transmitting bodies. As herein shown by way of description rather than limitation, the work is shown as a gear 4 having helical gear teeth 5. Gear 4 is securely fixed upon spindle 3 by means of a washer 6 which rests against shoulder 7 on the spindle arbor 8, washers 9 and nut 10.

During the profile generating operation, which may be any shaping operation such as cutting, shaving, grinding or filing, the gear 4 is held stationary. Between these operations, however, the work is indexed or rotated to present a new tooth to the profile generating tool. This indexing mechanism, Figs. 2 and 3, comprises a cam gear 11 which is journaled upon shaft 12 integral with frame 1. The drive for the cam gear 11 comprises an electric motor 13 which drives pulley 14 by means of belt 15. Pulley 14 is fixed upon shaft 16 which is journaled in the frame 1. Gear 17, fixed on one end of shaft 16, meshes with gear 18 fixed upon shaft 19. Shaft 19 is journaled in frame 1. Gear 20, fixed on the other end of shaft 19, meshes with gear 21 fixed on shaft 22 also journaled in the frame 1. Gear 23 fixed on shaft 22 meshes directly with cam gear 11. The drive is as follows: Driven pulley 14 drives shaft 16 and gear 17. Gear 17 drives gear 18, shaft 19 and gear 20. Gear 20 drives gear 21, shaft 22 and gear 23. Gear 23 drives cam gear 11. Gear 20 also drives crank disk gear 24 for purposes described below.

The mechanism for holding the gear 4 in any position to which it is indexed comprises a circular rack 25 which is splined on to shaft 2, a driving gear 26 fixed to the face of rack 25 and a pawl 27 slidably mounted in housing 28 fixed to the frame 1. Pawl 27 is backed up by compression springs 29 which tend to project pawl 27 toward the right and into engagement with rack 25. Pawl 27 is provided on its inner face with a roller 30 which rolls against cam face 31 of cam groove 32 formed in gear 11. It will be noted that surface 31 of cam groove has a raised area 33. The raised area 33 has a greater radius than the rest of the cam surface 31 and therefore causes roller 30 to move radially outwardly from shaft 2 thereby withdrawing pawl 27 from interengagement with toothed rack 25. While the pawl 27 is disengaged from rack 25, shaft 2 and work gear 4 are free to be indexed.

The indexing of the gear 4 is effected by the following members: Slide 35 supported for vertical sliding movement on frame 1 and provided with a roller 36 which travels in cam groove 37. A lever 38 pivotally mounted on pin 39 is pivotally connected at one end with slide 35 and at the other end with connecting rod 40. Connecting rod 40 is pivotally connected as at 41 with slide member 42 slidably mounted in guide members 43 for vertical reciprocation. Slide 42 also supports drive pawl 44 for horizontal reciprocation.

One end of a bell crank 45, pivoted as at 46, has a pin and roller thereon operating in a vertical slot 47 in pawl 44 and a roller 48 on the other end of the bell crank rolls along cam face 50 of cam gear 11. When pawl 27 is disengaged from rack 25, as roller 30 rolls along surface 33, roller 36 rolls along the portion of cam groove 37 having the lesser diameter thereby causing slide 35 to travel downwardly, lever 38 to swing counterclockwise, and slide 42 to travel upwardly in guides 43. Just prior to the time that slide 42 begins to travel upwardly, roller 48 rolls upon the high side, that is, the portion of cam surface 50 having the greater diameter which swings bell crank 45 counterclockwise and shifts pawl 44 to the left to engagement with gear 26. Thus, as slide 42 slides upwardly it also raises pawl 44 thereby rotating gear 26 counterclockwise, Fig. 3, and indexes gear 4, Fig. 1, clockwise to present the next tooth or surface to the profile generating tool.

It should be noted that pivot pin 39 which supports lever 38 is adjustable along its support 51 and that the pivotal connection 52 between slide 35 and lever 38 is also horizontally adjustable. By shifting pivot 39 in slot 53 of support 51 to the left, Fig. 3, one can increase the stroke of pawl 44 and thereby increase the angular distance that the gear 4 is indexed. By shifting pivot 39 to the right, Fig. 3, the angular distance that gear 4 is indexed with each stroke of pawl 44 is decreased.

The profile generating tool can be any of the well known shaping tools such as a cutting tool or grinding tool. By way of illustration, the profile generating tool is shown as a simple cutter 60 held in a tool holder 61 by set screws 62. The shaving tool holder 61 is mounted on a tool holder slide 63. Slide 63 is slidably mounted on pivoted arm 64 by guides 65. Slide block 63 reciprocates radially of arm 64. This radial reciprocation is effected by cam 66. Cam 66 is pivotally supported upon a plate 70 by an Allen screw 67, bushing 68 and nut 69. Plate 70 is slidably adjustable laterally in the horizontal groove 71 in the frame member 1, Figs. 7 and 9. Cam member 66 can also be adjusted by rotating the same about bushing 68. The bolts 72 and 73 at the top and bottom of cam 66 pass through elongated arcuate slots 74 in the cam 66 which permit limited pivoted or rotary adjustment of the cam 66.

Tool slide 63 is provided with a pin 75 which supports roller 76 in cam groove of cam 66. As the arm 64 swings downwardly, roller 76 rolls against side wall 77 of the cam groove of cam 66 and causes tool slide 63 to slide radially inwardly along guideway 65 toward the gear from the position shown in Fig. 16 to that shown in Fig. 17. As the arm 64 swings from the postiion shown in Fig. 17 upwardly to that shown in Fig. 16, the roller 76 engages the other side wall 78 of the cam groove of cam 66 which causes the tool slide to move radially outwardly of arm 64. Roller 76 has a snug fit in cam groove of cam 66.

Arm 64 has a circular ring portion 80 which is journaled on a circular bearing 81 secured to slide member 82 by screws 83. Slide member 82 is guided for horizontal reciprocation on the frame 1 by guideways 84 and 85. Slide member 82 and bearing member 81 are provided with an opening 86 for the shaft 2. Thus, opening 86 provides a clearance as slide 82 and bearing 81 reciprocate laterally or horizontally with respect to shaft 2. The center of bearing 81, that is, the center about which arm 64 pivots, is designated 90, Fig. 1. This center, of course, reciprocates laterally with bearing 81.

Oscillation of the arm 64 about bearing 81 is effected by a lever 91 pivoted on a shaft 92 integral with the frame 1. A connecting rod 93 connects arm 91 with crank disk gear 24. Thus, rotation of crank gear 24 acting through connecting rod 93 oscillates arm 91 about its bearing support 92. Arm 91 is connected with the outer end of arm 64 by a slide connection 94 (Figs. 11, 15). Slide connection 94 comprises a slide member 95 secured to the end of arm 91 by bolt 96. Slide member 95 has a sliding fit in guide member 97 bolted to the end of arm 64. Sliding connection 94 between driving arm 91 and arm 64 is essential because arm 91 oscillates about a fixed center whereas arm 64 oscillates about center 90 which reciprocates in a rectilinear horizontal path with block 82.

Horizontal reciprocation of slide member 82 and bearing 81 is effected by cam 100. Cam 100 is pivotally mounted by means of pin 101 upon plate 102. Plate 102 is slidably mounted upon frame 1 for lateral or horizontal adjustment. Plate 102 is provided with horizontal ribs 103 which engage in horizontal grooves 104 in frame 1. The cam slide base 102 can be clamped in any position of lateral adjustment by clamps 105 which are secured by screws 106 to the frame 1, Fig. 6. Screws 106 screw into openings 107 provided in frame 1. The cam 100 can also be pivotally adjusted about pin 101 and secured in place by bolts 108 which pass through elongated angular slots 109 in the cam 100. Pivoted arm 64 is provided with adjustable support member 110 for roller 111 which rolls in the cam groove of cam 100. Support 110 is adjustably supported in groove 112 of arm 64 by screws 113. Screws 113 pass through elongated slots 114 in support 110.

As shown in Fig. 16, the arm 64 is at the beginning of its clockwise stroke. As roller 111 travels upwardly in cam 100 the roller contacts wall 115 of cam 100 which causes slide block 82 to slide or travel toward the left from the position shown in Fig. 16 to that shown in Fig. 17. On the reverse rotation of arm 64, roller 111 rolls along wall 116 of cam 100 and causes the slide 82 to travel progressively toward the right in guideways 84 from the position shown in Fig. 16 to that shown in Fig. 17. A hand operated locating arm 120 is pivoted to the frame at 121 and has a locating tooth 122 for interengaging gear 4 to locate the same preparatory to shaving the same to size.

The lower end of connecting rod 93 is supported on crank gear 24 by means of a pin and block 140. Block 140 is adjustable radially in guideways 141 of the gear 24 to vary its stroke. The upper end of connecting rod 93 is adjustably supported on arm 91. Connecting rod 93 is pivotally supported on block 142 which is adjustable vertically in plate 143 by means of adjusting screw 144. Plate 143 can be adjusted radially of arm 91 by loosening bolts 145 which are then free to slide in slot 146 in arm 91.

The gear 4 which may be a cast gear of metal, plastic, or any other material, may have its teeth roughed out. The gear which is to have its teeth shaped to the desired profile is mounted upon its support spindle 3 and properly located by locator 122 before being clamped into place by turning down nut 10. Locator 122 is now swung down to released position and the machine is set in operation. As arm 64 pivots downwardly clockwise about center 90, cam 100 acting through roller 111 shifts slide block 82 and the center of rotation 90 of arm 64 to the left, Fig. 16, along a straight line path determined by guideways 84. Simultaneously roller 76, operating in cam 66, causes the tool support and the tool to slide radially of arm 64 toward the center of rotation of the arm. It is this triple or compound movement to which the tool is subjected which determines the path of the tool and the surface which is generated by the cutting edge 130 of the tool 60. The path of the cutting tool 60 is shown in Fig. 19.

During the cutting operation the gear is held stationary by pawl 27 and rack 25. As the tool retreats from the work, that is, travels from Fig. 17 to Fig. 16, the indexing mechanism comes into play as above described and indexes or rotates the gear 4 one tooth so that the next tooth is now presented to the cutter 60. As shown, the tool is cutting the lower face of the gear teeth 5. After the lower face of the gear teeth 5 have been shaved or cut to the proper profile, the gear is then turned around on the gear holder 3 which now presents the other face of the teeth to the cutting tool to have the proper profile generated.

It is evident that the profile generated by the cutting edge 130 of the tool can be adjusted to cut an infinite variety of profiles by adjusting the position of cams 100 and 66, as above described, by adjusting the angular oscillation of arm 64 which is accomplished by adjusting the pivotal connection of connecting rod 93 with crank gear 24 and arm 64.

Referring to Fig. 19, as the tool moves from the dotted line position to the full line position, the axis 90, about which tool and arm 64 pivot, moves a distance equal to the distance from the position where the involute tangent (dotted line showing of tool) intersects the intersect line to the profile origin. This movement is effected by cam 100. While the tool moves from a point on the profile of the tooth to the profile origin point, the distance of the tool edge 130 from the spindle 3 (center of gear 4) has decreased from a distance greater than to a distance equal to the radius of the base circle. This change in the position of the tool is effected by the cam 66 and the swinging arm 64. As herein shown, the evolute is a circle called the base circle and the involute is a circular involute curve. The evolute is shown as a circular curve for descriptive purposes only. The evolute can be any continuous curve, e. g., an elliptical, parabolic, or hyperbolic curve.

I claim:

1. A device for generating a profile on a rolling power transmitting body, comprising means for supporting said body, a support swingable about an axis shiftable relative to said body, a shaping instrument mounted on said support and shiftable radially thereof, and cam means for shifting said axis as the support swings and for simultaneously shifting said instrument radially of said axis whereby a profile is generated on the said body by the shaping instrument.

2. A device for generating a profile on a rolling power transmitting body, comprising a stationary support for said body, a slidable member slidable along a rectilinear path, an arm pivotally supported on said slide member for pivotal movement about an axis traveling in a straight line passing through the axis of said body, a tool holder slidable radially of said arm, a shaping tool carried by said tool holder, a cam cooperating with the swinging arm for shifting the slide member as the arm swings, a second cam cooperating with the tool holder for shifting the tool holder radially also as the arm swings whereby the shaping tool shapes a profile on the said body.

3. A device for generating a profile on a rolling power transmitting body comprising means for supporting said body in a fixed position while generating a profile on said body, an instrument support, a bearing upon which said instrument support is journaled for swinging about an axis, a rectilinearly movable support upon which said bearing is fixed, a shaping instrument mounted on said instrument support for rectilinear radial movement along said instrument support toward and away from its axis of swinging, means for swinging said instrument support about its said axis, and mechanism co-acting with said instrument support as it swings for simultaneously moving the shaping instrument radially inwardly toward said axis of swinging and for rectilinearly moving the said bearing and bearing support whereby a profile is generated on said body by the shaping instrument.

4. A device for generating a profile on a rolling power transmitting body comprising means for supporting said body about a center while generating a profile on said body, an instrument support, a bearing upon which said instrument support is journaled for swinging about an axis, a rectilinearly movable support upon which said bearing is fixed, a shaping instrument mounted on said instrument support for rectilinear radial movement along said instrument support toward and away from its axis of swinging, means for swinging said instrument support about its said axis, and mechanism co-acting with said instrument support as it swings the shaping instrument toward a straight line passing through said center and the axis about which said instrument support swings for moving the shaping instrument radially inwardly toward said axis of swinging, and mechanism also co-acting with said instrument support as it swings said shaping instrument toward a straight line passing through the axis of rotation and said center to simultaneously move said bearing and its movable support rectilinearly in a direction such that the shaping instrument and the axis about which the instrument support swings also move toward said center whereby a profile is generated on said body by the shaping instrument.

5. A device for generating a profile on a rolling power transmitting body comprising means for supporting said body on a fixed center while generating a profile on said body, an instrument support, a bearing upon which said instrument support is journaled for swinging about an axis, a rectilinearly movable support upon which said bearing is fixed, a shaping instrument mounted on said instrument support for rectilinear radial movement along said instrument support toward and away from its axis of swinging, means for swinging said instrument support about its said axis toward and away from a straight line passing through the center of the support means for the power transmitting body and the axis of the instrument support, and mechanism co-acting with said instrument support as it swings for simultaneously moving the shaping instrument radially inwardly toward said axis of swinging as said instrument support swings toward said straight line and for rectilinearly moving the said bearing and bearing support toward said support means for said power transmitting body and for simultaneously moving the shaping instrument radially outwardly from said axis of swinging and for rectilinearly moving said bearing and bearing support away from the support means for said power transmitting body whereby a profile is generated on said body by the shaping instrument.

6. A device for generating a profile on a rolling power transmitting body comprising means for supporting said body in a stationary position about a center while generating a profile on said body, an instrument support, a bearing upon which said instrument support is journaled for swinging about an axis, a rectilinearly movable support upon which said bearing is mounted, guideways in which said support moves along a rectilinear path such that said axis always travels in a single straight line passing through said axis and said center, a shaping instrument mounted on said instrument support for straight line radial movement along said instrument support toward and away from its axis of swinging, and means for swinging said instrument support about its axis toward and away from a position wherein the straight line along which the instrument moves coincides with the straight line passing through said axis and said center, and mechanism co-acting with said instrument support as it swings in a direction to bring said straight lines into coincidence for simultaneously moving the shaping instrument radially inwardly toward said axis of swinging and for rectilinearly moving said bearing and bearing support so as to move said axis toward said center.

7. A device for generating a profile on a rolling power transmitting body comprising a spindle for supporting said body in a stationary position about a center while generating a profile on said body, an instrument support, a bearing upon which said instrument support is journaled for swinging about an axis, a rectilinearly movable support upon which said bearing is mounted, guideways in which said support moves along a rectilinear path such that said axis always travels in a single straight line passing through said axis and said center, a shaping instrument mounted on said instrument support for straight line radial movement along said instrument support toward and away from its axis of swinging, and means for swinging said instrument support about its axis toward and away from a position wherein the straight line along which the instrument moves coincides with the straight line passing through said axis and said center, and mechanism co-acting with said instrument support as it swings in a direction to bring said straight lines into coincidence for simultaneously moving the shaping instrument radially inwardly toward said axis of swinging and for rectilinearly moving said bearing and bearing support so as to move said axis toward said center.

8. A device for generating a profile on a rolling power transmitting body comprising means for supporting said body in a stationary position about a center while generating a profile on said body, an instrument support arm, a bearing upon which said instrument support arm is journaled for swinging about an axis, a rectilinearly movable support upon which said bearing is mounted, guideways in which said support moves along a rectilinear path such that said axis always travels in a single straight line passing through said axis and said center, a shaping instrument and holder therefor mounted on said instrument support for straight line radial movement along said instrument support arm toward and away from its axis of swinging, and means for swinging said instrument support arm about its axis toward and away from a position wherein the straight line along which the instrument and holder move coincides with the straight line passing through said axis and said center, and mechanism coacting with said instrument support arm as it swings in a direction to bring said straight lines into coincidence for simultaneously moving the shaping instrument and holder radially inwardly toward said axis of swinging and for rectilinearly moving said bearing and bearing support so as to move said axis toward said center.

9. A device for generating a profile on a rolling power transmitting body comprising means for supporting said body in a stationary position about a center while generating a profile on said body, an instrument support, a bearing upon which said instrument support is journaled for swinging about an axis, a rectilinearly movable support upon which said bearing is mounted, guideways in which said support moves along a rectilinear path such that said axis always travels in a single straight line passing through said axis and said center, a shaping instrument mounted on said instrument support for straight line radial movement along said instrument support toward and away from its axis of swinging, and means for swinging said instrument support about its axis toward and away from a position wherein the straight line along which the instrument moves coincides with the straight line passing through said axis and said center, and mechanism co-acting with said instrument support as it swings in a direction to bring said straight lines into coincidence for simultaneously moving the shaping instrument radially inwardly toward said axis of swinging, and means for rectilinearly moving said bearing and bearing support so as to move said axis toward said center simultaneously as the support arm swings in a direction to bring said straight lines into coincidence.

JAMES H. BARNES.

REFERENCES CITED

The following references are of record in the file of this patent:

UNITED STATES PATENTS

| Number | Name | Date |
|---|---|---|
| 1,790,560 | Tanner et al. | Nov. 26, 1927 |
| 1,724,169 | Barnes | Mar. 9, 1925 |
| 886,398 | Nardin | May 5, 1908 |
| 1,692,520 | Stonebraker | Nov. 20, 1928 |
| 2,260,918 | Wainwright | Oct. 28, 1941 |
| 2,166,020 | Philippe | July 11, 1939 |

FOREIGN PATENTS

| Number | Country | Date |
|---|---|---|
| 99,408 | Germany | Sept. 13, 1898 |
| 521,001 | Great Britain | May 9, 1940 |